(12) United States Patent
Butterfield et al.

(10) Patent No.: US 7,639,393 B2
(45) Date of Patent: Dec. 29, 2009

(54) SYSTEMS AND METHODS FOR ADJUSTING SPOT COLOR INKS

(75) Inventors: Paul M Butterfield, Ontario, NY (US); Martin S Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 685 days.

(21) Appl. No.: 11/168,921

(22) Filed: Jun. 29, 2005

(65) Prior Publication Data

US 2007/0002343 A1    Jan. 4, 2007

(51) Int. Cl.
G06F 15/00 (2006.01)
G03F 3/08 (2006.01)
G06K 9/00 (2006.01)

(52) U.S. Cl. ................ 358/1.9; 358/518; 358/520; 382/167

(58) Field of Classification Search ........... 358/1.9, 358/1.2, 1.4, 3.03, 3.06, 3.13, 3.22, 3.27, 358/3.3, 518, 501, 526, 536, 520, 534, 502, 358/504; 382/254, 270, 274, 167
See application file for complete search history.

(56) References Cited

U.S. PATENT DOCUMENTS

| | | | | |
|---|---|---|---|---|
| 6,066,422 A * | 5/2000 | Blaszak et al. | ............. | 430/45.4 |
| 6,068,361 A * | 5/2000 | Mantell | ............. | 347/15 |
| 6,089,691 A * | 7/2000 | Kakutani | ............. | 347/15 |
| 6,249,315 B1 * | 6/2001 | Holm | ............. | 348/251 |
| 6,344,899 B1 * | 2/2002 | Tabata et al. | ............. | 358/1.1 |
| 6,439,682 B1 * | 8/2002 | Kakutani | ............. | 347/15 |
| 6,592,212 B1 * | 7/2003 | Kakutani | ............. | 347/86 |
| 7,292,368 B2 * | 11/2007 | Rozzi | ............. | 358/1.3 |
| 2002/0196484 A1* | 12/2002 | Chang | ............. | 358/534 |
| 2003/0179924 A1* | 9/2003 | Holm | ............. | 382/162 |
| 2004/0095432 A1* | 5/2004 | Kakutani | ............. | 347/43 |
| 2004/0223172 A1* | 11/2004 | Yoshizawa et al. | ............. | 358/1.8 |
| 2005/0226498 A1* | 10/2005 | Lee | ............. | 382/162 |
| 2005/0248601 A1* | 11/2005 | Rozzi | ............. | 347/15 |
| 2006/0125860 A1* | 6/2006 | Arazaki | ............. | 347/12 |

* cited by examiner

Primary Examiner—Madeleine A Nguyen
(74) Attorney, Agent, or Firm—Oliff & Berridge, PLC

(57) ABSTRACT

Systems and methods are provided for printing a spot ink. The spot ink may be prepared before the time of printing. The spot ink may be adjusted by half-toning or supplemental CMYK colors at the time of printing.

15 Claims, 3 Drawing Sheets

SYSTEMS AND METHODS FOR ADJUSTING SPOT COLOR INKS

BACKGROUND

Spot color inks are used to achieve a specific color more accurately than process mixtures of cyan-magenta-yellow-black (CMYK), to avoid the halftone pattern associated with process color printing, or to print colors outside the gamut of CMYK. A spot color ink (also called "spot ink") provides a pre-mixed color ink that is directly printed, instead of a color that is obtained by halftoned levels of CMYK components at the time when the color is being printed. Spot color inks are common in the offset printing trade, and are becoming available for digital production color systems. Typically, spot color inks are offered in the colors of popular samples-based color systems. For example, a user may acquire a particular spot ink color by selecting the color from a suite of samples of existing spot ink colors.

Spot color inks are often selected to ensure the accuracy of a specific color. For example, the red color of Xerox Corporation's logo is specified as Pantone 032. Many of Xerox's printed collaterals and packaging are printed with offset or flexographic inks specifically formulated to achieve this unique red color.

SUMMARY

The standards for color accuracy for spot color inks are becoming higher, necessitating tight color tolerances on ink manufacturers and on the vendors of printing systems using spot color inks. There are product acquisition costs associated with meeting those tight color tolerances, and market costs for failing to meet those tight color tolerances.

It is difficult to manufacture printing systems and inks that are capable of achieving accurate color matches. This difficulty is multiplied by the large number of spot colors to be made available. For example, the number of spot colors available from the most popular vendor is more than 1,000. It is estimated that, if a day is required for a manufacturer to print-test for color accuracy, it may take four work-years devoted solely to the validation process.

Using methods that are currently available, color differences of 10*$\Delta$E (ten times the perceptible color difference) or more have been observed, resulting in customer dissatisfaction and its associated costs. Accordingly, an improved yet inexpensive method for achieving customers' high standards for spot color accuracy is needed.

This disclosure discloses exemplary systems and methods for printing a spot color ink (also referred to alternatively in this disclosure as "spot ink"). For example, a method of printing a spot ink may include determining whether a difference between an actual color of the spot ink and an intended color is within a tolerance level, and, if the determined difference is not within the tolerance level, adjusting the color of the spot ink.

This and other features and details are described in, or are apparent from, the following detailed description.

BRIEF DESCRIPTION OF THE DRAWINGS

Various exemplary details of systems and methods are described, with reference to the following figures, wherein.

DETAILED DESCRIPTION OF EMBODIMENTS

Systems and methods may be provided for adjusting colors of rendered or prepared spot inks by halftone adjustment of the spot colors at time of printing, or by adding supplementary CMYK inks at time of printing. Such systems and methods may reduce the need for infeasibly tight ink manufacturing tolerances, as well as allow customers to fine-tune colors to achieve specific color preferences.

The spot color inks that are to be adjusted at time of printing may be conventionally prepared, rendered, or otherwise formulated prior to the time of printing. The spot color inks may be prepared to achieve a color match with respective intended colors as close as economically feasible.

Adjustments may be made to the prepared spot color inks at time of printing. The adjustments may be achieved by halftoning, dithering, or the like. The adjustments may include adding or reducing a shade of a color in an area of interest by adding or removing a color by adding or removing selected pixels of an area so as to achieve a visual result that is the same as if a shade of the color had been added to the whole area. The adjustments may be made to the spot color inks. The adjustments may also be made using supplementary CMYK inks.

The color adjustments may be controlled in a manner similar to those conventionally used to adjust process color simulations of spot colors, such as, for example, direct control of color area coverages. The adjustments may also be controlled to translate perceptual inputs, physical color measurements or psychophysical color measurements to device-specific changes. The physical color measurements are those that are based on the physical properties of the image, for example, reflectance. The psychophysical color measurements are those that transform physical measurements into quantities correlating to human visual perception, for example, CIELAB.

Figure 1:
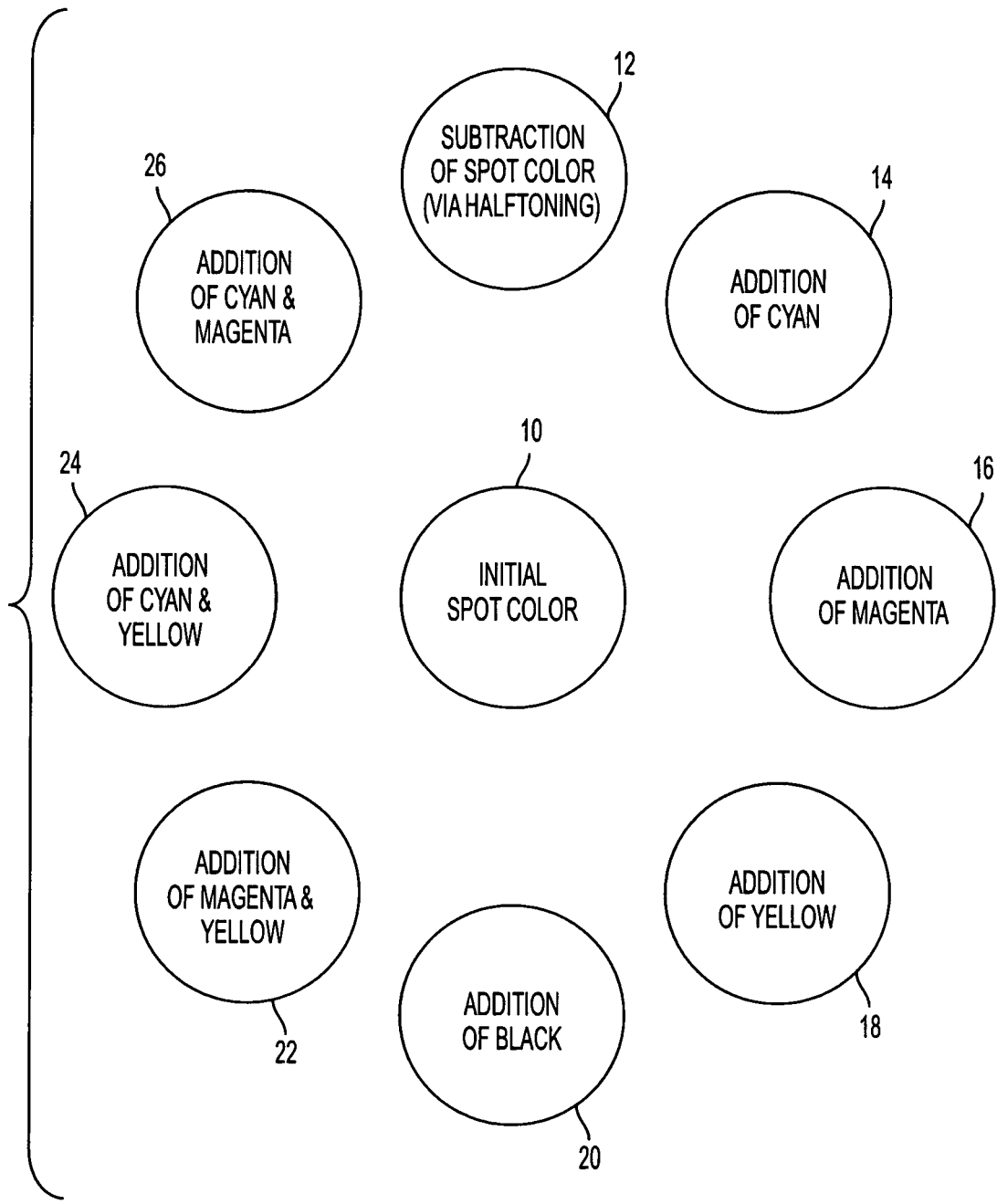
FIG. 1 illustrates an exemplary color adjustment of a spot ink.

FIG. 1 is an exemplary diagram illustrating color adjustments that may be applied to spot color inks. As shown in FIG. 1, a plurality of adjustments may be made to an initial spot color 10. For example, the strength of the spot ink may be adjusted via halftoning to achieve an adjusted color 12. The halftoning may include adding a shade of the spot color to, or subtracting a shade of the spot color from, the prepared spot color to achieve an intend color. Also, an adjustment may be achieved by an addition or half-tone mixture of cyan, as a supplementary ink, to achieve an adjusted color 14. Thus, a spot color that is generally of a red color may be made more bluish with the addition of a tint of cyan. Similarly, adjustments may be achieved by addition of cyan, magenta, yellow and black, or halftone combinations thereof, to achieve the adjusted colors 16, 18, 20, 22, 24 and 26.

The adjustment may be made in a single step, or in a loop of steps to approach a desired result. The adjustment may also be made by first producing a set of adjusted colors with, for example, different supplementary CMYK inks and combinations before selecting one adjusted color from the set of adjusted colors.

When a spot ink is prepared to be close to a desired color, half-tone addition or subtraction of colorants may be subtle. Thus, the amount of added supplementary colors, which may be referred to as "noise," to uniform tints may be minimized. For example, an occasional spot of C, M, Y, or K may be adequate to bias the color in the desired direction.

The half-tone-based adjustments may provide flexibility to move in most directions in color space for most colors. However, there may be constraints with highly chromatic colors, because there is no color vector in the direction of higher chroma. Thus, a spot ink may be formulated with a recipe that is slightly modified to err on the side of excess chroma. The systems and methods for adjusting spot color inks may then adjust by diminishing the excess chroma by moving the colors toward a neutral axis in the color space. Alternatively or additionally, the systems and methods for adjusting spot color inks may reduce the excess chroma by using print engine control of developed mass or ink thickness.

Figure 2:
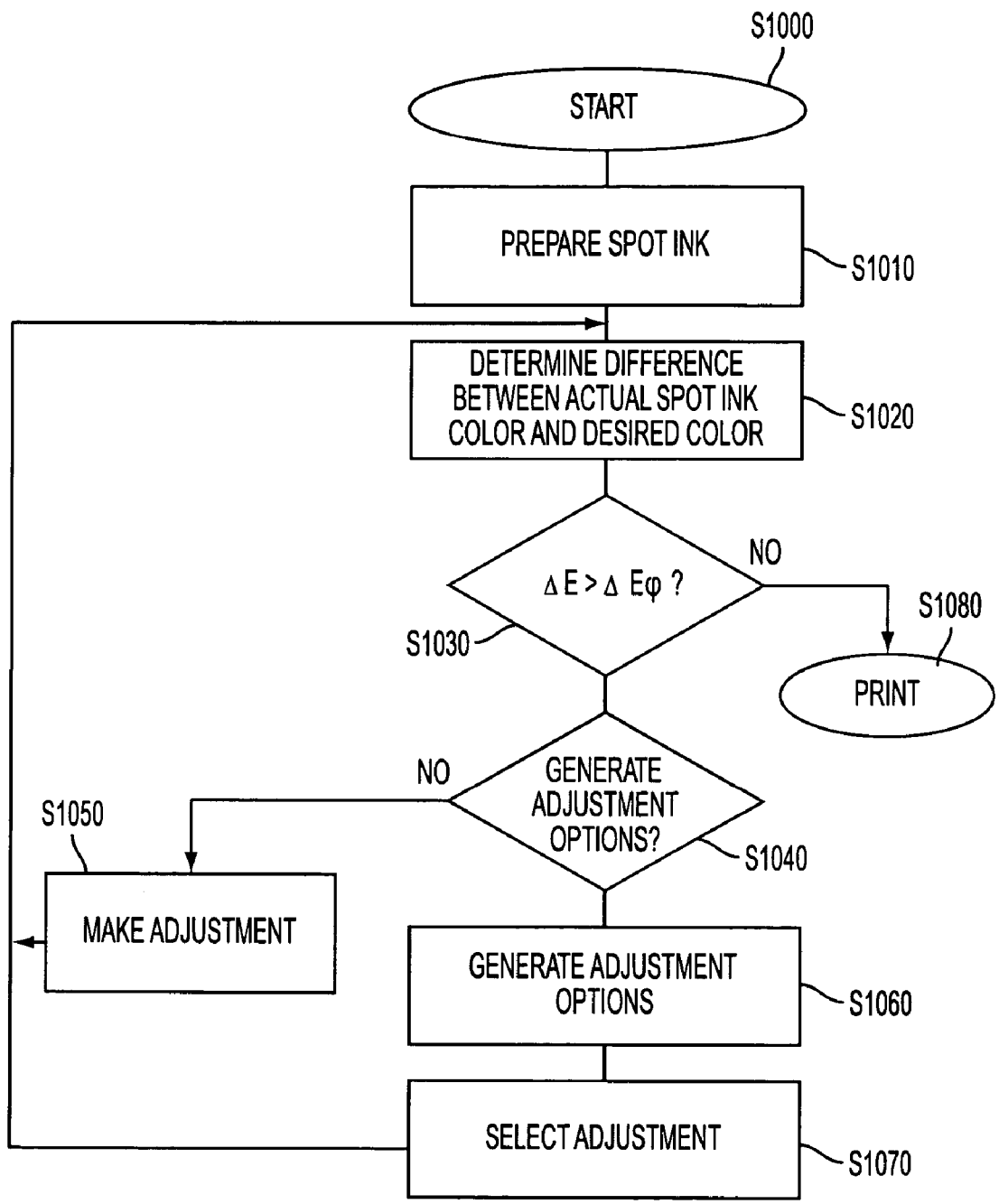
FIG. 2 outlines an exemplary process of adjusting a color of a spot ink.

FIG. 2 illustrates an exemplary method for adjusting the color of a spot ink. As shown in FIG. 2, the method starts at step S1000 and continues to step S1010 where a spot ink is prepared, rendered or formulated before the time of printing.

Next, in step S1020, a difference between the actual color of the spot ink and a desired color is determined. The determination may be made automatically by a device. The determination may alternatively be made by a visual inspection performed by a user. The method then proceeds to step S1030.

In step S1030, it is determined whether the difference $\Delta E$ is greater than a tolerance level $\Delta E_0$. If the difference is not greater than the tolerance level, there is no need to adjust the color. Accordingly, the method goes to step S1080, where the method of color adjustment ends and printing starts.

On the other hand, if it is determined at step S1030 that the difference is greater than the tolerance level, the method proceeds to step S1040.

In step S11040, a further determination is made whether to generate adjustment options. If it is determined that adjustment options are not to be generated, the method proceeds to step S1050 where an adjustment is made to reduce the difference. Thereafter, the method returns to step S1020.

On the other hand, if it is determined at step S1040 that adjustment options are to be generated, the method proceeds to step S1060. In step S1060, adjustment options are generated. For example, a set of color adjustments may be generated by a variety of half-tone or dithered adjustment to either the spot color ink or supplementary CMYK inks.

It will be appreciated that, in fact, step S1040 may be an implicit step, rather than requiring actual processing or an actual decision. For example, if the system is not capable of generating adjustment options, then of course step S1040 is unnecessary, and the system process would proceed directly to step S1050. If the system is capable of generating adjustment options, then the process may actually proceed directly from step S1030 to step S1060. If the system is capable of generating adjustment options, but does not necessarily always present the options for selection, then the determination of whether to generate adjustment options may be based on one or more predetermined criteria, such as (1) the magnitude of the difference between $\Delta E$ and $\Delta E_0$, (2) the color (e.g., adjustment options may be generated for specialty blue colors, but not specialty red colors, or vice versa), or the like.

Next, in step S1070, a color adjustment is selected from the adjustment options such as the set of color adjustments. The selection may be automatically performed by a device based on, for example, a minimum of the differences between each of the adjusted colors and the desired color. The selection may alternatively be made manually by a user with a visual comparison among the adjustment options. Thereafter, the method returns to step S1020. However, in some embodiments, the method may directly proceed to step S1080 without returning to step S1020.

The method illustrated in FIG. 2 may be implemented in a computer program product that can be executed on a computer. The computer program product may be a computer-readable recording medium on which a control program is recorded, or it may be a transmittable carrier wave in which the control program is embodied as a data signal.

Figure 3:
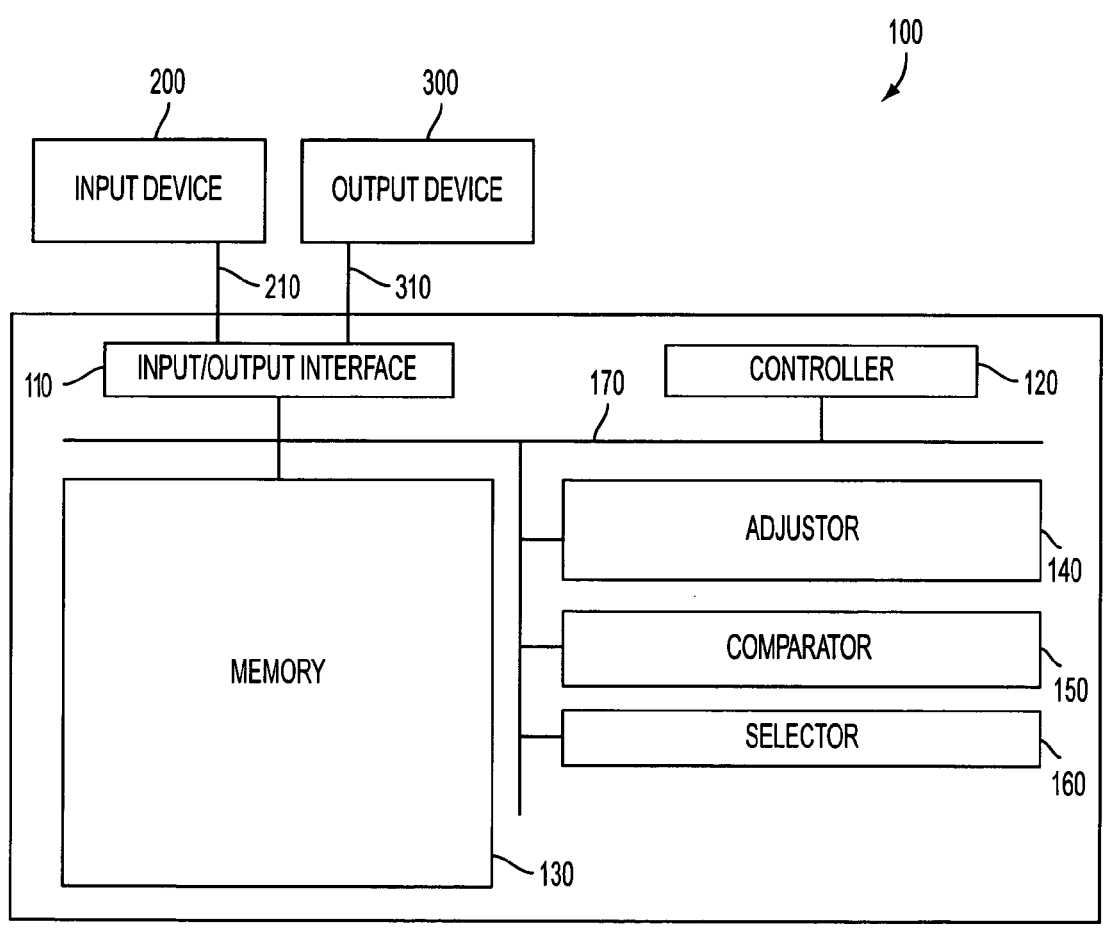
FIG. 3 illustrates an exemplary system for adjusting a color of a spot ink.

FIG. 3 is a functional block diagram of an exemplary system 100 for adjusting the color of a spot ink. As shown in FIG. 3, the system 100 may include an input/output interface 110, a controller 120, a memory 130, an adjustor 140, a comparator 150, and a selector 160, each interconnected by one or more control and/or data buses and/or application programming interfaces 170.

The input/output interface 110 may interface with an input device 200 and an output device 300. The input device 200 and output device 300 may be connected to the system 100 via links 210 and 310, respectively. The memory 130 may store data made available by the input/output interface 110, the adjustor 140, the comparator 140 and the selector 160. The memory 130 may also store spot color information and tolerance level information.

In operation, under the control of controller 120, the input/output interface 110 may receive a color in the form of, for example, electronic information output by a spectrophotometer that has measured a color sample. The color may be compared by the comparator 150 with information representing a desired color. The desired color information may be stored in the memory 130. The desired color information may also be input from the input device 200.

Based on the comparison, the comparator 150 may determine a difference between the received color and the desired color. The comparator 150 may further compare the determined difference with a tolerance level.

When the difference is greater than the tolerance level, the adjustor 140 may make adjustments under the control of controller 120. The adjustment may be made in a single color direction in the color space toward the desired color. The adjustment may also be made in a form of a set of color adjustments.

When the adjustor makes a set of color adjustments, the selector 160, under control of the controller 120, may select one color adjustment from the set of color adjustments. Compared to the other color adjustments in the set of color adjustments, the selected color adjustment may have, for example, the smallest color difference with the desired color.

The set of color adjustments may also be output, through output device 300, to a user. For example, each of the adjusted colors from the set of color adjustments may be displayed to the user. The user may select a color adjustment based on, for example, a visual inspection of the set of adjusted colors.

After a color adjustment is made, the adjusted color may be output for feedback before a second run of adjustment. The adjustment may also be analyzed to decide whether the adjusted color is within the tolerance level with respect to the desired color before the adjusted color is output. For example, the color adjustment may be repeated automatically to achieve a satisfactory tolerance level before being output.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method of printing with a marking device a spot ink for color matching of a specific color, the spot ink being pre-prepared for the specific color, comprising:

determining whether a difference between an actual color of the spot ink and the specific color is within a tolerance level; and if the determined difference is not within the tolerance level, adjusting the actual color of the spot ink with a color adjustor by at least halftoning or dithering; and printing the adjusted actual color with the marking device on a print medium, wherein the prepared spot ink contains excess chroma of the specific color.

2. The method of claim 1, further comprising:
determining the difference before determining whether the difference is within the tolerance level.

3. The method of claim 1, further comprising:
making a subtraction from the spot ink via halftoning.

4. The method of claim 1, further comprising:
making an addition to the spot ink via halftoning.

5. The method of claim 1, further comprising:
adding one or more supplementary inks to the spot ink.

6. The method of claim 5, the supplementary inks being supplementary cyan-magenta-yellow-black (CMYK) inks.

7. The method of claim 1, the adjusting the color of the spot ink comprising:
controlling a color area coverage of the spot ink.

8. A computer-readable medium including computer-executable instructions for performing the method recited in claim 1.

9. A marking system, comprising:
a color adjustor;
a marking device that marks a print medium with a spot ink, the spot ink pre-prepared for a specific color; and
a controller,
wherein, when a difference between an actual color of the spot ink and the specific color exceeds a tolerance level, the controller controls the color adjustor to adjust the color of the spot ink by at least halftoning or dithering before the marking device uses the spot ink,
the controller controls the marking device to mark the adjusted color of the spot ink on the print medium, and
the prepared spot ink contains excess chroma of the specific color.

10. The marking system of claim 9, further comprising a color comparator, wherein the controller controls the color comparator to:
determine the difference between the actual color of the spot ink and the intended color; and
determine whether the difference exceeds the tolerance level.

11. The marking system of claim 9, wherein the color adjustor makes a subtraction from the spot ink via halftoning.

12. The marking system of claim 9, wherein the color adjustor makes an addition to the spot ink via half-toning.

13. The marking system of claim 9, wherein the color adjustor adds one or more supplementary cyan-magenta-yellow-black (CMYK) inks to the spot ink.

14. The marking system of claim 9, wherein the controller controls a color area coverage of the spot ink.

15. A xerographic marking device including the marking system of claim 9.

* * * * *